United States Patent
He et al.

(10) Patent No.: US 10,309,436 B2
(45) Date of Patent: Jun. 4, 2019

(54) SINGLE-GROOVE AND SHORT-TAIL PULLING RIVET AND ERECTION METHOD THEREOF

(71) Applicant: MEISHAN CRRC FASTENING SYSTEM CO., LTD., Sichuan (CN)

(72) Inventors: Xu He, Sichuan (CN); Yu Liu, Sichuan (CN); Kai Fu, Sichuan (CN); Xiong Zhang, Sichuan (CN); Yunlong Jia, Sichuan (CN); Guangcheng Dai, Sichuan (CN); Xinrong Li, Sichuan (CN); Xia Wang, Sichuan (CN); Yong Wan, Sichuan (CN)

(73) Assignee: MEISHAN CRRC FASTENING SYSTEM CO., LTD., Meishan, Sichuan (CN)

( * ) Notice: Subject to any disclaimer, the term of this patent is extended or adjusted under 35 U.S.C. 154(b) by 233 days.

(21) Appl. No.: 15/378,885

(22) Filed: Dec. 14, 2016

(65) Prior Publication Data
US 2018/0038404 A1 Feb. 8, 2018

(30) Foreign Application Priority Data
Aug. 8, 2016 (CN) .......................... 2016 1 0644781

(51) Int. Cl.
*B21J 15/02* (2006.01)
*F16B 19/05* (2006.01)
(Continued)

(52) U.S. Cl.
CPC ............. *F16B 19/10* (2013.01); *B21J 15/022* (2013.01); *B21J 15/045* (2013.01); *F16B 19/05* (2013.01); *F16B 2019/1009* (2013.01)

(58) Field of Classification Search
CPC .. F16B 19/10; F16B 2019/1009; F16B 19/05; B21J 15/045; B21J 15/022; B21J 5/022;
(Continued)

(56) References Cited

U.S. PATENT DOCUMENTS

2015/0252833 A1* 9/2015 Brewer .................. B21J 15/022
29/509

FOREIGN PATENT DOCUMENTS

| CN | 2906172 Y | 5/2007 |
| CN | 201318365 Y | 9/2009 |

* cited by examiner

*Primary Examiner* — Jacob J Cigna
*Assistant Examiner* — Lee A Holly
(74) *Attorney, Agent, or Firm* — Novick, Kim & Lee, PLLC; Allen Xue (57) ABSTRACT

Provided is a single-groove and short-tail pulling rivet and an erection method thereof, and the pulling rivet comprises a single groove and a short tail having a broached groove with a continuous and smooth cambered surface, and is characterized by easy manufacturing, low cost and convenient erection. The broached groove is an arc surface with three sections of different radiuses, which solves stress concentration and sticking of a single-groove and short-tail rivet during riveting, and allows a claw of a riveting machine to be engaged to the best position automatically. The tooth profile of a locking groove section of the rivet is a curve combining an arc and a straight line, which greatly improves fastening force. In a word, the invention solves insufficient clamping degree of the short tail, seizing during riveting, blocking of the broached groove, failed riveting, shortage and loss of tightness of existing short-tail pulling rivets, and meets the performance and reliability requirements of the fastening systems for rolling stocks.

3 Claims, 6 Drawing Sheets

(51) Int. Cl.
*B21J 15/04* (2006.01)
*F16B 19/10* (2006.01)

(58) Field of Classification Search
CPC ....... B21J 9/12; B21J 13/06; Y10T 29/53735; Y10T 29/49915
See application file for complete search history.

SINGLE-GROOVE AND SHORT-TAIL PULLING RIVET AND ERECTION METHOD THEREOF

(1) FIELD OF THE INVENTION

The invention relates to a single-groove and short-tail pulling rivet and an erection method thereof, in particular to a cold-drawn riveting technology, mainly used for connecting components of rolling stock. The invention belongs to riveting (B21J) and fastener (F16B) in the metal mechanical processing field.

(2) DESCRIPTION OF THE RELATED ART

The similar contents between cold-drawn rivets used for connecting components of rolling stock and the connection method thereof disclosed in the prior art and the invention are as follows: 1) See *Pulling Rivets* (ZL200520035325.X) disclosed in Chinese Patent for ordinary pulling rivets. The disadvantages are as follows: the riveting process requires snapping the separating groove and abandoning the pull rod, there are large impact force and noise, poor environmental protection and material waste during riveting, and the hydraulic riveting machine requires large riveting pressure and large diameter of an oil cylinder and heavy weight.

2) Ordinary short-tail pulling rivets: See *Short-tail Pulling Rivets* (ZL200820065124.8) disclosed in Chinese Patent. As the separating groove is cancelled, the separating groove may not be snapped and the pull rod may not be abandoned during riveting compared with the above 1). Thus, ordinary short-tail pulling rivets do not cause impact force, noise and material waste and are environment friendly; and a riveting machine requires small riveting force and small capacity. The disadvantages are as follows: ① tightening force between the locking groove section (irrespective of an annular groove section or a thread section) and the collar is insufficient, especially the thread section; and general fastening strength can reach level 8.8 only. ② tightness between a short tail with existing annular groove shape and a claw of the riveting machine is limited, which fails to meet the requirements of the rolling stock provided with a fastening system requiring higher performance and reliability. ③ short-tail pulling rivets with annular groove section cannot be erected conveniently.

Figure 10:
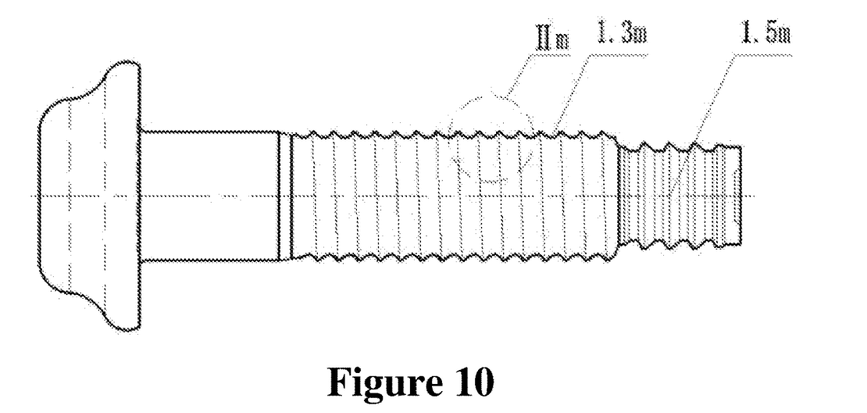
FIG. 10 is a single-piece graph of an existing multi-groove and short-tail rivet.
Figure 11:
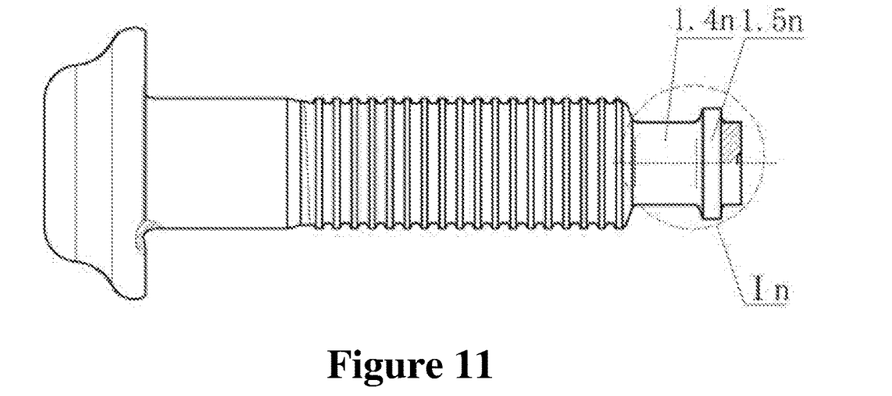
FIG. 11 is a single-piece graph of an existing single-groove and short-tail rivet.
Figure 12:
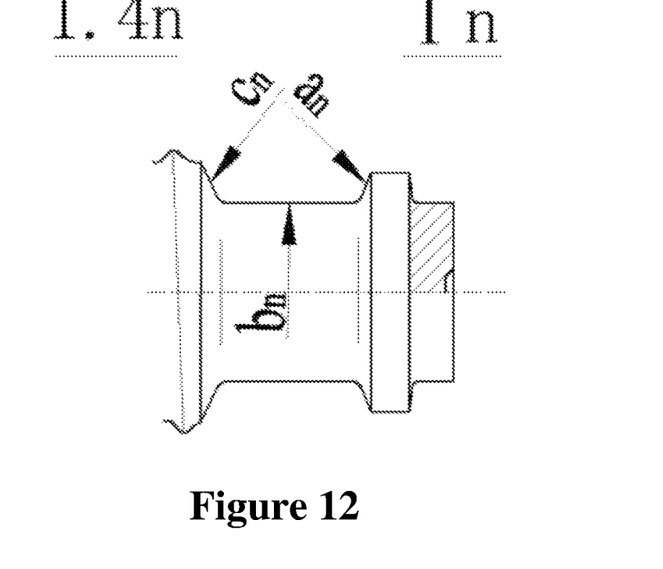
FIG. 12 is an enlarged view of local part In in FIG. 11, i.e. front view of the broached groove of existing single-groove and short-tail pulling rivet 1.4n.

Existing short-tail pulling rivets have two short-tail structures: ① multi-groove short tail: 1.5m in FIG. 10. A multi-groove short tail has multiple tooth spaces, and each tooth space includes a tooth and a broached groove. A groove is engaged with a latch of the claw of the riveting machine depend on tooth profile accuracy. In order to avoid the above situation, the positioning of multi-groove short tail rivets is very demanding during riveting and operators must align a riveting machine and a rivet correctly. Under severe operation conditions, a broached groove of a multi-groove short tail rivet may be easily blocked, possibly causing riveting defeat and damaging the riveting machine. ② A single groove short tail consists of a short-tail tooth 1.5n and a short-tail broached groove 1.4n, as shown in FIG. 11. The single-groove short tail is subject to concentrated axial force during riveting possibly because there are only one tooth, one groove and shape of existing broached groove. As shown in FIG. 12, due to the shape of existing short-tail broached groove 1.4n (bn section: straight line, two inclined sections Cn=an), a circular bead at the root of the broached groove 1.4n cannot eliminate stress concentration. Thus, existing single-groove short tail may subject to tooth shape damage due to axial force when the claw of a riveting machine is not engaged with the broached groove well during actual riveting.

Figure 13:
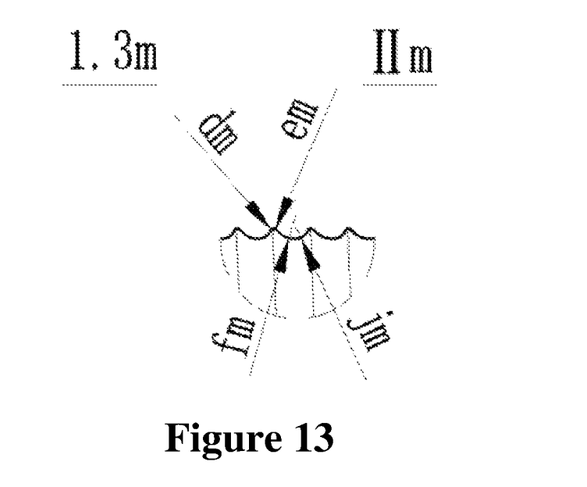
FIG. 13 is an enlarged view of local part IIm in FIG. 10, i.e. tooth profile of the locking groove section 1.3m of existing multi-groove and short-tail rivet.

See FIG. 13, in 1.3m tooth profile of the locking groove section of existing short-tail rivets: dm and em are radii of slotted tooth of arc; and fm and jm are arc radii in the groove respectively. Such tooth profile cannot be easily processed and detected, and its mould cannot be easily manufactured at low cost.

(3) SUMMARY OF THE INVENTION

The invention provides a single-groove and short-tail pulling rivet and an erection method thereof, aiming at solving high positioning requirements, easily jammed broached groove, stress concentration, poor tightness of the claw and insufficient tightening force of the locking groove section during riveting of existing short-tail pulling rivets, so as to meet performance and reliability requirements of the fastening system of the components of rolling stock.

The technical solution is as follows:
1. A single-groove short-tail pulling rivet consists of a rivet and a collar, the rivet comprises a rivet head 1.1, a polished rod 1.2, a locking groove section 1.3 and a short tail connected in order from front to back, the collar comprises a flange 2.1 and a sleeve 2.2 from front to back, and the collar is arranged on the locking groove section 1.3; and characterized in that:
   1) the short tail is a single-groove short tail consisting of a broached groove 1.4 with a continuous and smooth curve, and a short tail tooth 1.5;
   2) the broached groove 1.4 with a continuous and smooth curve is designed such that a smooth and continuous cambered surface is formed by three sections of arcs c, b and a with different radii in order from front to back, radii of arcs corresponding to the three sections of cambered surfaces c, b and a are Rc, Rb and Ra respectively, and Ra<Rc<Rb;
   3) thickness of the collar flange is M, length of the sleeve is N, and M/N=0.15-0.4 as designed;
   4) the front end face of the collar flange is provided with a waveform pattern 2.3.

The tooth profile of the locking groove section 1.3 of the single-groove and short-tail pulling rivet is a smooth curve combining an arc with a straight line ($\alpha<\beta$), and the projection length ratio meets t:n=0.4-0.5; m:n=0.3-0.4; h:n=0.25-0.3; wherein n is teeth space, t is rear half tooth width, m is front half tooth width and h is tooth depth.

The installation method of the single groove and short tail pulling rivet is characterized by comprising the following steps:
1) passing the rivet through a mounting hole 3a of a riveted part 3 from front to back, and screwing the collar onto the locking groove section of the rivet from back to front; 2) sleeving a claw 4.1 of a riveting machine onto the short tail end of the rivet, changing inner diameter of the claw under the action of an anvil 4.2 and an oil cylinder by loosening, grasping and loosening again the claw; and pushing the claw with a hand to move forward axially in relation to the short tail end until the rear end face 1.5A of the short tail comes into contact with a locating surface 4A of the claw; 3) starting the riveting machine 4, moving the claw thereof backward due to an axial force, separating the locating surface 4A of the claw from the rear end face 1.5A of the short tail, and sliding a claw profiling part 4C toward the rear end face 1.5A of the short tail along a cambered surface of the broached groove 1.4 due to the axial force until the profiling part 4C is engaged with the broached groove 1.4 of the rivet and clamps the rivet; 4) applying an axial force to the riveted part continuously by the riveting machine so that the anvil and the claw do relative motion, and moving the rivet backward due to a clamping force; axially pushing and extruding the anvil 4.2 forward the collar, compressing the collar by the riveted part 3 tightly and locking the collar on the locking groove section 1.3 of the rivet in a deformed way; and 5) when the riveting machine reaches the preset pressure, hydraulically reversing the riveting machine, pushing the claw pushed back by the drive of a hydraulic cylinder, moving the anvil backward and exiting, and returning the profiling part 4C to initial state, and removing the riveting machine from the rivet to completing riveting.

The advantages of the invention are as follows:
1) A rivet with single-groove short tail can be manufactured more easily and reduce manufacturing cost effectively compared with a rivet with a multi-groove short tail. The requirements for using a rivet with a single-groove short tail are less rigorous than a rivet with a multi-groove short tail, and a rivet with a single-groove short tail can be conveniently arranged.
2) A single-groove short tail is provided with a specially designed broached groove with a continuous and smooth curve (1.4: Ra<Rc<Rb). The advantages are as follows: ① stress concentration is eliminated as axial force during riveting becomes more diffuse at the presence of an arc surface and the radius Rb of the arc surface is much larger than the radius Ra of the corner at the root of the broached groove; i.e. the advantages of the single-groove and short-tail pulling rivets are kept and problems of existing single-groove and short-tail pulling rivets during riveting are solved, including stress concentration and sticking. ② due to the characteristics of continuous and smooth curve, a claw of the riveting machine can be engaged at the best position automatically.
3) The tooth profile of the locking groove section 1.3 of the rivet is a smooth curve combining an arc with a straight line; despite comparable tightening force compared with the locking groove section of existing short-tail pulling rivets, such tooth profile can be easily defected due to small processing difficulty and more suitable for rotation and coordination of the snap tooth of the collar, which greatly reduces the difficulty of manufacturing a snap tooth of a collar. In general, manufacturing cost and detection cost of products are greatly reduced without compromising use performance.
4) The design parameter of the collar is M/N=0.15-0.4, and the flange plate has strong anti-pressure ability. Thus, deformation of the collar can be reduced and tightening force of the locking groove section increases. When riveting a non-circular hole by existing riveting technology (non-circular hole formed by tolerance or mounting hole, i.e. the condition that a riveting hole can allow a rivet to pass but cannot meet the use requirements), the collar is always deformed during erection and loses tightening force on the locking groove section. However, the invention provides the above collar design to avoid such condition.
5) The front end face of the collar flange is provided with a waveform pattern 2.3 and retains clamping force after erection.
6) The more simple and effective end face (claw positioning face) positioning method is used during erection.

(5) DESCRIPTION OF THE PREFERRED EMBODIMENT

Figure 1:
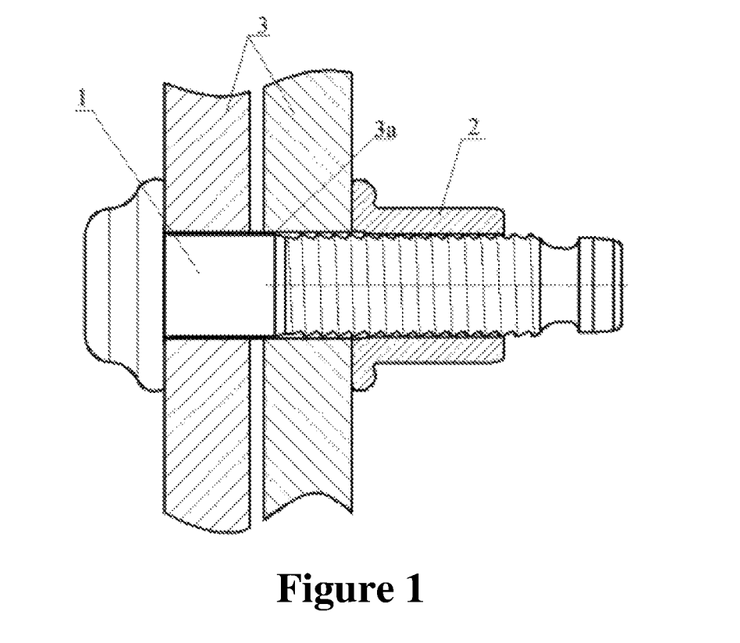
FIG. 1 is a structural drawing of the single-groove and short-tail pulling rivet, i.e. graphical representation of step 1 of the erection method.
Figure 2:
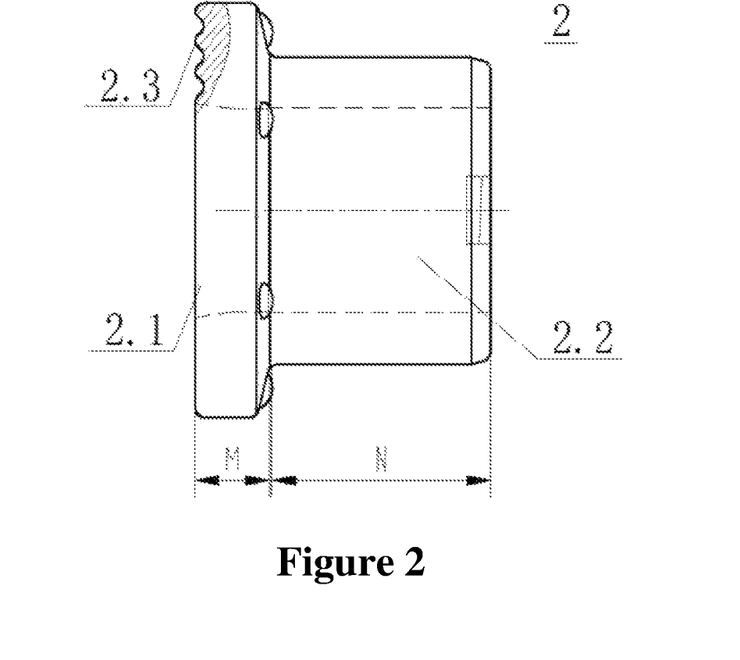
FIG. 2 is a single-piece graph of the collar 2 in FIG. 1.
Figure 3:
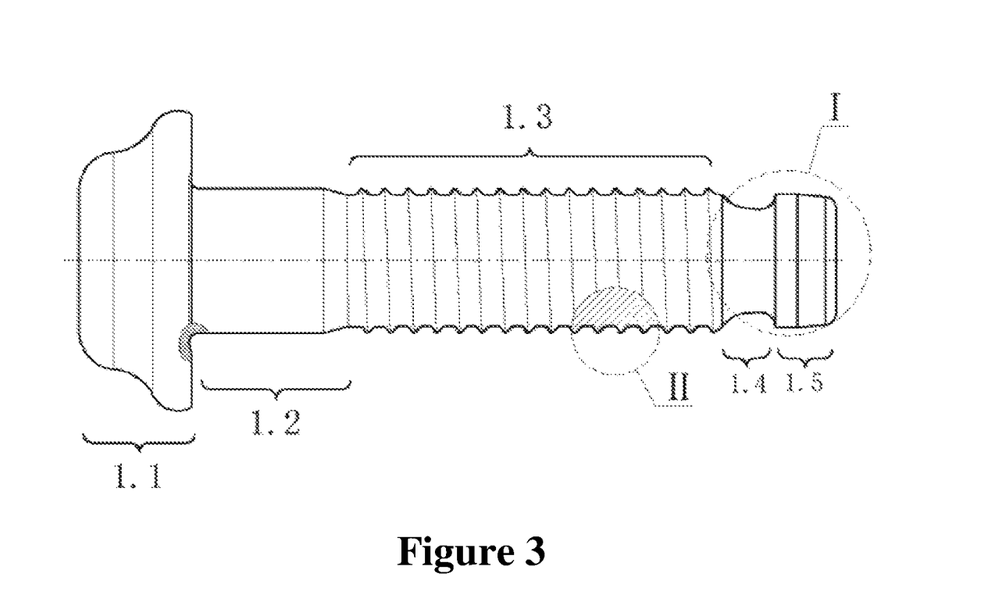
FIG. 3 is a single-piece graph of the rivet 1 in FIG. 1.
Figure 4:
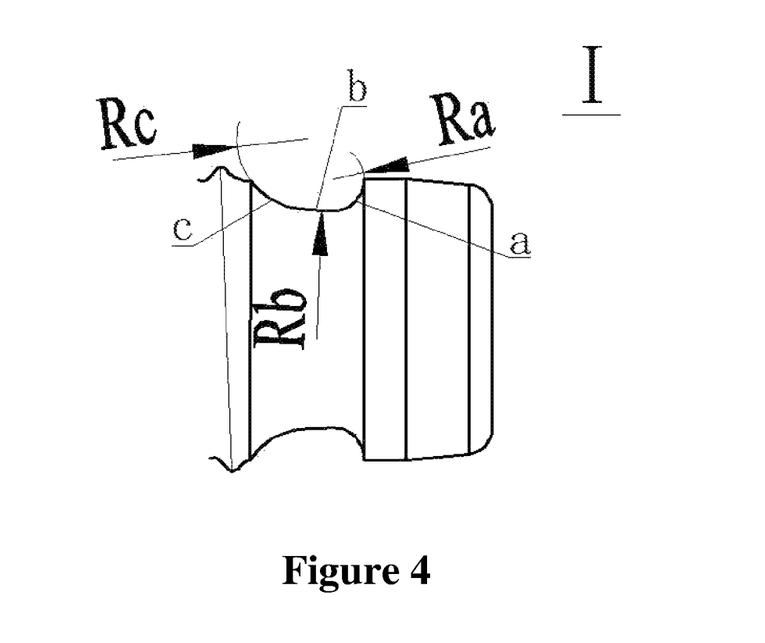
FIG. 4 is an enlarged drawing of local part I in FIG. 3, i.e. a front view of the broached groove 1.4 with a continuous and smooth curve.
Figure 5:
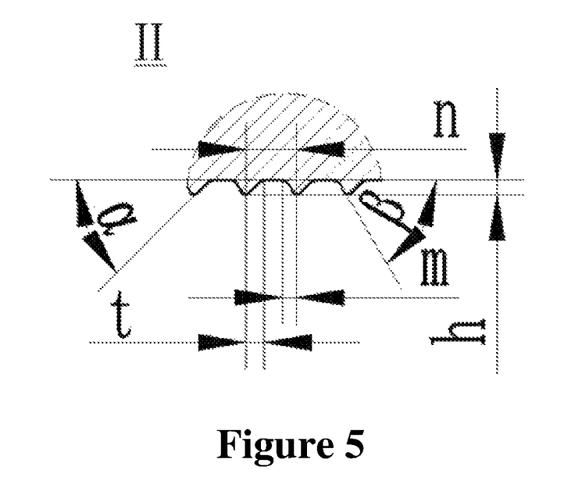
FIG. 5 is an enlarged drawing of local part II in FIG. 3, i.e. an enlarged drawing of the tooth of the locking groove section 1.3.

See FIG. 1, the single-groove and short-tail pulling rivet in the example consists of a rivet 1 and a collar 2. See FIG. 3, the rivet 1 comprises a rivet head 1.1, a polished rod 1.2, a locking groove section 1.3 and a short tail connected in order from front to back. See FIG. 2, the collar 2 comprises a flange 2.1 and a sleeve 2.2 from front to back. See FIG. 1, the collar 2 is arranged on the locking groove section 1.3. New design of the invention is as follows:
1) See FIG. 3, the short tail is a single-groove short tail consisting of a broached groove 1.4 with a continuous and smooth curve, and a short tail tooth 1.5; i.e. the single-groove short tail consists of a broached groove 1.4 with a continuous and smooth curve, and a short tail tooth 1.5.
2) See FIG. 4, the broached groove 1.4 with a continuous and smooth curve is designed such that a smooth and continuous cambered surface is formed by three sections of arcs c, b and a with different radii in order from front to back, radii of arcs corresponding to the three sections of cambered surfaces c, b and a are Rc, Rb and Ra respectively, and Ra<Rc<Rb.
3) See FIG. 2, thickness of the flange 2.1 of the collar 2 is M, length of the sleeve 2.2 is N, and M/N=0.15-0.4.
4) See FIG. 2, the front end face of the flange of the collar 2 is provided with a waveform pattern 2.3.
5) See FIG. 5, the tooth profile of the locking groove section 1.3 of the rivet is a smooth curve combining an arc with a straight line ($\alpha<\beta$), and the projection length ratio meets t:n=0.4-0.5; m:n=0.3-0.4; h:n=0.25-0.3; wherein n is teeth space, t is rear half tooth width, m is front half tooth width and h is tooth depth.

Figure 6:
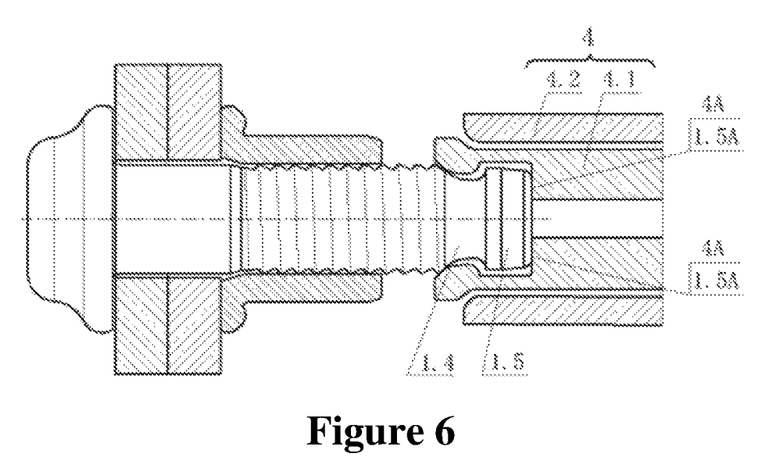
FIG. 6 is a graphical representation of step 2 of the erection method.
Figure 7:
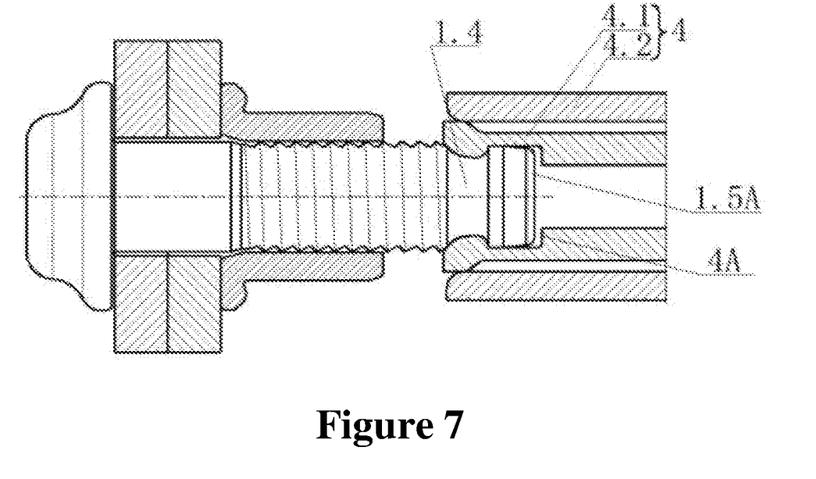
FIG. 7 is a graphical representation of step 3 of the erection method.
Figure 8:
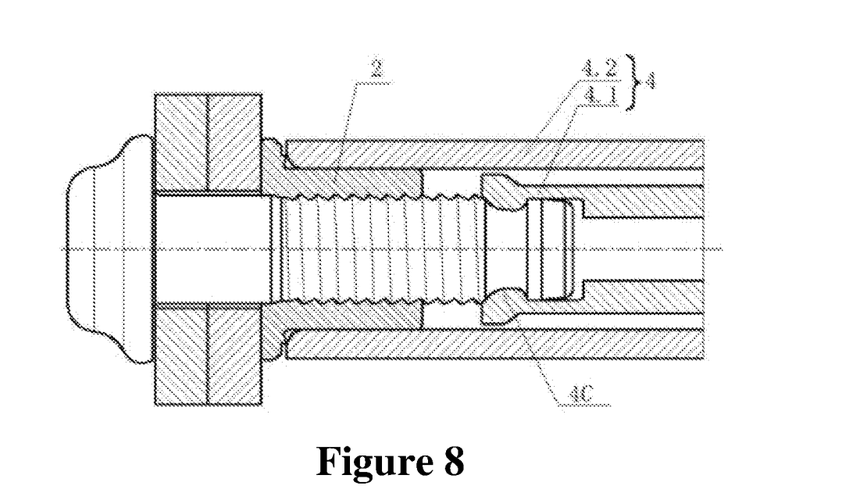
FIG. 8 is a graphical representation of step 4 of the erection method.
Figure 9:
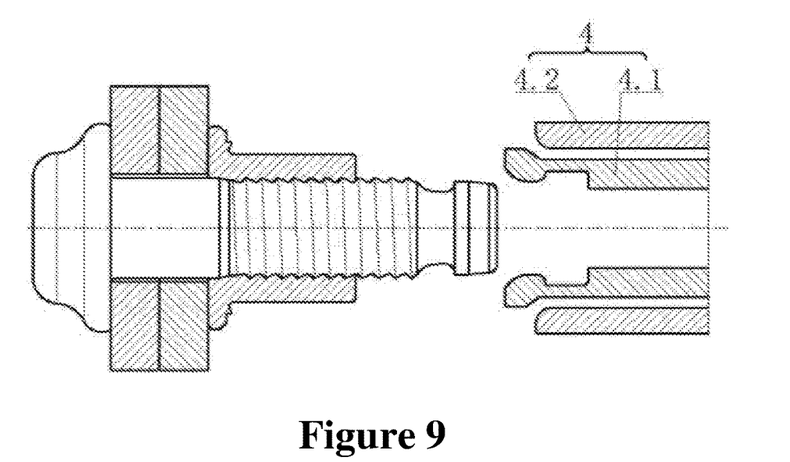
FIG. 9 is a graphical representation of step 9 of the erection method.

The erection method of the single-groove and short-tail pulling rivet comprises the following steps:
1) See FIG. 1, passing the rivet through a mounting hole 3a of a riveted part 3 from front to back, and screwing the collar onto the locking groove section of the rivet from back to front (double-sided riveting);
2) See FIG. 6, sleeving a claw 4.1 of a riveting machine onto the short tail end of the rivet, changing inner diameter of the claw under the action of an anvil 4.2 and an oil cylinder by loosening, grasping and loosening again the claw; and pushing the claw with a hand to move forward axially in relation to the short tail end until the rear end face 1.5A of the short tail comes into contact with a locating surface 4A of the claw;
3) See FIG. 7, starting the riveting machine 4, moving the claw thereof backward due to an axial force, separating the locating surface 4A of the claw from the rear end face 1.5A of the short tail, and sliding a claw profiling part 4C toward the rear end face 1.5A of the short tail along a cambered surface of the broached groove 1.4 due to the axial force until the profiling part 4C is engaged with the broached groove 1.4 of the rivet and clamps the rivet;
4) See FIG. 8, applying an axial force to the riveted part continuously by the riveting machine so that the anvil 4.2 and the claw 4.1 do relative motion, and moving the rivet backward due to a clamping force; axially pushing and extruding the anvil 4.2 forward the collar, compressing the collar by the riveted part 3 tightly and locking the collar on the locking groove section 1.3 of the rivet in a deformed way; and
5) See FIG. 9, when the riveting machine reaches the preset pressure, hydraulically reversing the riveting machine, pushing the claw pushed back by the drive of a hydraulic cylinder, moving the anvil backward and exiting, and returning the profiling part 4C to initial state, and removing the riveting machine from the rivet to completing riveting.

The invention claimed is:

1. A rivet consisting of a rivet and a collar,
wherein the rivet comprises a rivet head, a polished rod, a locking groove section, and a tail section connected in sequence,
wherein the collar comprises a flange and a sleeve, and the collar is configured to be arranged on the locking groove section,
wherein the tail section comprises a broached groove having a curved surface adjacent to a tail tooth,
wherein a profile of the curved surface along an axial direction of the rivet consists of arc c having a radius of Rc, arc b having a radius of Rb, and arc a having a radius of Ra, and Ra<Rc<Rb,
wherein, in the collar, a thickness of the flange is M, and a length of the sleeve is N, and a ratio between M and N is in the range of 0.15 to 0.4, and
a front end face of the collar flange has a waveform pattern.

2. The rivet according to claim 1, wherein the locking groove section of the rivet has a continuous thread, the continuous thread has a pitch of n, a first flank having a width of t, a second flank having a width of m, and a thread depth of h, wherein a ratio between t and n is in the range of 0.4 to 0.5, a ratio between m and n is in the range of 0.3 to 0.4, and a ratio between h and n is in the range of 0.25 to 0.3.

3. A method for installing the rivet according to claim 1, comprising:
1) passing the rivet through a mounting hole of a riveted part and screwing the collar onto the locking groove section of the rivet;
2) sleeving a claw of a riveting machine onto the tail section of the rivet, changing an inner diameter of the claw using an anvil and an oil cylinder; and pushing the claw against the tail portion until the tail portion comes into contact with a locating surface of the claw;
3) pulling the claw away from the tail section to separate the locating surface of the claw from the tail section until a profiling part of the claw engages the broached groove of the tail section of the rivet;
4) applying a force along the axial direction to the riveted part continuously by the riveting machine so as to push the anvil.

* * * * *